United States Patent [19]
Froning

[11] 3,729,053
[45] Apr. 24, 1973

[54] METHOD FOR INCREASING PERMEABILITY OF OIL-BEARING FORMATIONS

[75] Inventor: H R. Froning, Tulsa, Okla.

[73] Assignee: Amoco Productions Company, Tulsa, Okla.

[22] Filed: Jan. 5, 1972

[21] Appl. No.: 217,703

[52] U.S. Cl. ................................. 166/304, 166/273
[51] Int. Cl. ............................................. E21b 43/25
[58] Field of Search ............... 166/304, 305 R, 273, 166/311, 312, 279

[56] References Cited

UNITED STATES PATENTS

| | | | |
|---|---|---|---|
| 2,356,205 | 8/1944 | Blair, Jr. et al. | 166/305 R |
| 2,699,832 | 1/1955 | Allen | 166/304 |
| 3,162,601 | 12/1964 | Jones | 166/304 X |
| 3,172,473 | 3/1965 | Crowley et al. | 166/304 X |
| 3,241,614 | 3/1966 | Bertness | 166/304 |
| 3,375,192 | 3/1968 | Rowlinson | 166/304 X |
| 3,402,770 | 9/1968 | Messenger | 166/305 R |
| 3,470,958 | 10/1969 | Kinney | 166/305 R |
| 3,467,194 | 9/1969 | Kinney et al. | 166/305 R |
| 3,554,289 | 1/1971 | Webb | 166/305 R |
| 3,670,819 | 6/1972 | Dauben et al. | 166/304 |

*Primary Examiner*—Stephen J. Novosad
*Attorney*—Paul F. Hawley et al.

[57] ABSTRACT

Water injection wells are treated to increase their injectivity by first introducing a solvent such as carbon disulfide, carbon tetrachloride or a composition rich in monocyclic aromatics, into the formation surrounding the well. The waxes and/or bituminous materials normally found at or near the surface of such wells are highly soluble in solvents of this kind. In order to assure the stability of the subsequently injected micellar solution, a suitable buffer such as water or a predominantly aliphatic hydrocarbon, e.g., kerosene, gas oil or crude oil, etc., is injected to immediately follow the aromatic hydrocarbon solvent. Thereafter, the micellar solution, usually containing not more than about 50 percent water, is injected and is substantially miscible with the buffer slug. This system of solvent buffer and micellar solution is then forced out into the formation by means of water or other suitable drive agent.

12 Claims, No Drawings

METHOD FOR INCREASING PERMEABILITY OF OIL-BEARING FORMATIONS

The present invention relates to an improved process for increasing the permeability of an oil-bearing formation. More particularly, it is concerned with a method for increasing the permeability of such formations by first treating the latter with a suitable wax solvent, followed by a buffer slug and thereafter injecting therein a micellar solution having the ability ti dissolve the residual oil, take up connate water and disperse out into the formation finely-divided organic and inorganic materials that ordinarily tend to interfere with the flow of fluids through the formation.

BACKGROUND OF THE INVENTION

One of the common problems in the production of petroleum from underground deposits thereof results from the collection of tar, wax and bituminous materials that form a "skin" at or near the face of the well bore, ultimately reducing the oil flow, i.e., rock permeability, to uneconomical levels. This condition can, of course, occur in the case of either production or water injection wells. When this happens the flow of fluids is effectively shut off from the well bore in all but those portions of the formations that have extremely high permeability. This problem is also encountered where it is desired to convert a producing well into a water injection well. As has been previously demonstrated (W. B. Gogarty et al., "Injection Well Stimulation with Micellar Solutions," Journal of Petroleum Technology, Dec. 1970) these deposits or skin-like layers at or near the well bore tend to restrict the subsequent injection of water to a greater degree than the effect of the residual oil saturation on water permeability. A somewhat similar problem occurs to varying degrees when certain miscible solvent processes are employed for improved oil recovery. In these instances, solvent-water and/or gas-water injection are employed to yield improved mobility control and reservoir sweep. In the miscible solvent processes — at least those employing a hydrocarbon such as propane — such solvent can create a tendency for asphaltenes and other heavy components of crude oil to drop out in the vicinity of the well bore. These deposits restrict the flow of injected fluids during subsequent flooding or producing operations. Aromatic hydrocarbons or hydrocarbon mixtures having high, e.g., at least 50 percent, concentrations of aromatics are probably the best solvents for tar, wax and bituminous materials that make up the skin found at or near the face of the well bore. However, such solvents when contacted with a micellar solution of the type now used in injection well cleanout work tend to cause the micellar solutions to become unstable.

DESCRIPTION OF THE INVENTION

I have now discovered that the troublesome deposits of the kind referred to above can be effectively removed by first injecting into the formation around the well bore a suitable solvent such as, for example, carbontetrachloride, carbon disulfide and hydrocarbon compositions rich in monocyclic aromatic hydrocarbons. Thereafter a slug of water, aliphatic hydrocarbon, e.g., crude oil, kerosene, gas oil, etc., or an aliphatic hydrocarbon solution of $CS_2$ or $CCl_4$, is introduced into the injection well. Owing to the high solubility of water, crude oil, kerosene, etc., or the aforesaid $CS_2$ or $CCl_4$ hydrocarbon solution in the micellar solution, the system remains in a relatively undisturbed state approaching that of a single phase condition. Thus, water, a suitable aliphatic hydrocarbon, or a normally liquid aliphatic hydrocarbon containing less than about 10 percent by volume $CS_2$ or $CCl_4$, tends to function in the process of my invention as a buffer between the solvent and the micellar solution. An aliphatic hydrocarbon buffer is generally preferred where the solvent is in a state of high purity. The micellar solution is then driven out into the formation by water to displace the solvent far out away from the well bore. When all of the fluids have been injected they are retained in the formation usually for a period of from about 12 to 36 hours. In some cases either an oil-external or a water-external micellar fluid may be used. Generally, an oil-external fluid is preferred which in turn may be driven by progressively higher water-content micellar fluids. Micellar fluids of the oil-external type although capable of dissolving a portion of the organic deposits referred to above do not serve as a very effective solvent. However, once small particles of the deposit are loosened the surfactant present in either oil-external or water-external micellar solutions disperses the particles and aids in their removal from the area around the well bore. In particular, low water-content oil-external micellar systems also serve to increase oil relative permeability by removing connate water.

Where the process of my invention is employed to treat the formation adjacent an injection well, the solvent is injected in an amount corresponding to from about 1 to about 10 barrels and preferably from about 1 to 3 barrels per foot of formation to be treated, while the micellar solution which follows is preferably employed in amounts ranging from about 1 to about 10 barrels per foot of formation treated. The solvent should be applied in an amount sufficient to penetrate about 4 or 5 feet into the formation from the well bore while the micellar solution preferably should extend out into the formation for a distance of from about 2 to 20 feet. In practice it is desirable to follow the solvent immediately with a buffer slug of low asphalt-containing produced or reduced crudes or broad boiling range refinery feed stocks containing primarily aliphatic hydrocarbons. The buffer is generally employed in a volume corresponding to from about 0.1 to about 0.5 of the volume of solvent used. Larger volumes of buffer may be employed; however, little additional benefit is ordinarily realized therefrom. In the case of improving water injectivity performance, the benefits resulting from treatment in accordance with the present invention are generally outstanding since removal of residual oil saturation greatly increases the effective water permeability, particularly in the case of water-wet systems.

As previously stated the hydrocarbon solvent employed preferably predominates in one or more of the monocyclic aromatics, such as toluene, benzene, xylene, a mixed xylene refinery product, mixtures of these materials such as are found in an aromatic rich refinery cut, or ultraformate which contains about 50 percent aromatics. However, napthalene and dicyclic aromatics are useful for the process but generally, because of their melting points, are not as conveniently used.

The micellar solutions employed may be any of those known to the art for use in oil recovery processes and may be either oil-external or water-external. In this connection the expression "micellar solution" appearing in the present description and claims is to be construed as meaning either of these two types of solutions, unless expressly stated to the contrary. The components of the micellar solution employed in carrying out my invention comprise, broadly, a surface-active agent, a mineral oil, water and a cosurfactant. Examples of these ingredients are all well known to the art. However, where an oil-external micellar system is to be used I prefer the solutions taught in copending application U.S. Ser. No. 38,366, filed May 18, 1970, by James D. Gilliam et al., now abandoned. Typical of the compositions covered in that application are those employing as the surfactant 1 to 40 weight percent of a petroleum sulfonate having an average molecular weight in the range of 425 to 575, 0 to 80 weight percent of a hydrocarbon component, 0.1 to about 15 weight percent of a cosurfactant such as the reaction product of 4 to 6 mols of ethylene oxide with 1 mol of n-hexanol and from about 10 to about 95 weight percent water. In order to achieve good stability and the desired viscosity for these systems, up to about 10,000 to 20,000 ppm of sodium chloride or other suitable inorganic salts well known to the art may be added. In addition to the high water-content micellar solutions taught in the above-mentioned application, I may use those described and claimed in my copending application U.S. Ser. No. 848,681, filed Aug. 8, 1969. These compositions are similar to those described in U.S. Ser. No. 38,366 except that a lower molecular weight alcohol, e.g., isopropyl alcohol, is substituted for the ethoxylated hexanol as the cosurfactant. These systems contain from 85 to 95 weight percent water.

Typically, I introduce after the solvent, and prior to injection of the micellar solution, an aliphatic hydrocarbon (or equivalent) with which the micellar solution is much more compatible. For example, a micellar solution of the type contemplated in U.S. Ser. No. 38,366, mentioned above, containing 50 percent water can tolerate as much as 43 percent kerosene or 95 percent Stoddard solvent without becoming unstable. Micellar solutions containing in excess of 50 percent water, e.g., 65–95 percent water, generally can tolerate less than 5 percent aromatic hydrocarbon solvent. If a micellar solution of relatively high water content, i.e., greater than 50 percent, is to be used, then the aromatic solvent should be pushed out into the formation with a slug of water. This tends to reduce residual oil saturation. Thereafter, when the high water-content micellar solution is introduced into the formation, it remains stable and retains good flow characteristics.

The solvent and buffer slug, as well as the micellar solutions, are generally injected at a rate of about 0.1 to 5 bbls/min and at pressures of the order of 500–2500 psi. These injection pressures should of course be less than the fracturing pressure and preferably below the fracture parting pressure.

DESCRIPTION OF A SPECIFIC EMBODIMENT OF THE INVENTION

The process of my invention is further illustrated by reference to the following specific example:

EXAMPLE I

A production well in the Lobstick Cardium Unit, Alberta, Canada, is converted to an injection well in a waterflood project. The formation face about the well is coated with a skin of bituminous and waxy materials, resulting in a reduced flow of fluid in communication with the well bore. The well has about 20 feet of conglomerate and 20 feet of the Cardium sand. This work is done prior to alternate injection of enriched gas and water. 22 1/2 barrels of hydrocarbon solvent consisting primarily of a refinery cut containing about 50 percent monocyclic aromatics is injected into the formation at a rate of 4 bbls/min and at 2,000 psi. On completion of this step the solvent is allowed to remain in contact with the formation at and near the well bore face for a period of about three days. A volume of water corresponding to about one-fourth the solvent volume used is next introduced into the formation via said well, after which the solvent is dispersed out into the formation by introducing 70 barrels of 60 volume percent water content micellar solution in which the non-aqueous portion contains 65 percent kerosene, 28 percent sodium petroleum sulfonate (mol. wt. 457), 6 percent of the 6 mol ethylene oxide adduct of 1-hexanol, and 1 percent fusel oil — all percentages being by weight. This operation is conducted at an injection rate of 4 bbls/min and at a pressure of 1,800–2,500 psi. When the last of the fluid is injected the well is shut in overnight. The following day, water is injected at the rate of 6,500 bbls/day at 1,850 psi, and 4 days thereafter at a rate of 7,200 bbls/day at 1,300 psi. On the basis of the results, treatment with an aromatic solvent followed by injection of water and a micellar solution in accordance with this invention is considered to bring about a distinct improvement in the injectivity of said well by removal of the wax-like skin and residual oil.

Carbon disulfide and carbon tetrachloride, when substituted for the aromatic solvent employed in the above example, function in an equivalent manner.

I claim:

1. In a process for improving the permeability of an oil-bearing formation in which an objectionable deposit of a wax, tar or bituminous material is present therein and wherein said deposit is penetrated by an injection well, the improvement comprising introducing into said well and into said deposit a solvent for said deposit in an amount sufficient to dissolve and displace said deposit in said formation, thereafter injecting a slug of buffer material and following the latter with a micellar solution to further disperse said solvent and deposit out into said formation.

2. The process of claim 1 wherein the buffer slug is injected in an amount corresponding to from about 0.1 to about 0.5 of the volume of solvent employed.

3. The process of claim 2 wherein a mixed xylene product from a catalytic reformer stream is employed as the solvent for said wax, tar or bituminous material.

4. The process of claim 2 wherein the solvent is selected from the group consisting of $CS_2$, $CCl_4$ and a hydrocarbon stream rich in monocyclic aromatics.

5. The process of claim 4 wherein a slug of a low asphalt-containing crude is employed as the buffer.

6. The process of claim 2 wherein said solvent is $CS_2$.

7. The process of claim 2 wherein said solvent is displaced out into said formation with water prior to treatment with the micellar solution.

8. The process of claim 2 wherein the solvent is $CCl_4$.

9. The process of claim 2 wherein the solvent is a monocyclic aromatic hydrocarbon.

10. The process of claim 2 wherein the buffer is kerosene.

11. The process of claim 2 wherein the buffer is an aliphatic hydrocarbon containing no more than 10 percent $CS_2$.

12. The process of claim 2 wherein the buffer is an aliphatic hydrocarbon containing no more than 10 percent of $CCl_4$.

* * * * *